US009205839B2

(12) United States Patent
Lennevi et al.

(10) Patent No.: US 9,205,839 B2
(45) Date of Patent: Dec. 8, 2015

(54) ENERGY MANAGEMENT SYSTEM AND FUEL SAVING METHOD FOR A HYBRID ELECTRIC VEHICLE

(75) Inventors: Jerker Lennevi, Lerum (SE); Tobias Axelsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/394,756

(22) PCT Filed: May 8, 2012

(86) PCT No.: PCT/EP2012/001975
§ 371 (c)(1),
(2), (4) Date: Oct. 16, 2014

(87) PCT Pub. No.: WO2013/167149
PCT Pub. Date: Nov. 14, 2013

(65) Prior Publication Data
US 2015/0073637 A1    Mar. 12, 2015

(51) Int. Cl.
*B60W 30/18* (2012.01)
*B60W 20/00* (2006.01)
(Continued)

(52) U.S. Cl.
CPC .......... *B60W 30/18127* (2013.01); *B60L 7/16* (2013.01); *B60L 11/1861* (2013.01); *B60W 10/08* (2013.01); *B60W 10/26* (2013.01); *B60W 10/30* (2013.01); *B60W 20/00* (2013.01); *B60W 40/076* (2013.01); *B60W 50/0097* (2013.01);
(Continued)

(58) Field of Classification Search
CPC ............... B60W 30/18127; B60W 40/076; B60W 10/26; B60W 10/30; B60W 10/08; B60W 20/00; B60W 50/0097; B60W 2710/244; B60W 2710/305; B60W 2550/402; B60W 2550/143; B60W 2510/244; B60L 11/1861; B60L 7/16; Y02T 10/84
See application file for complete search history.

(56) References Cited

U.S. PATENT DOCUMENTS

| | | | |
|---|---|---|---|
| 6,856,866 B2 * | 2/2005 | Nakao | 701/22 |
| 7,665,559 B2 * | 2/2010 | De La Torre-Bueno | 180/65.29 |
| 8,718,848 B2 * | 5/2014 | Pfefferl et al. | 701/22 |
| 2005/0274553 A1 | 12/2005 | Salman et al. | |

(Continued)

FOREIGN PATENT DOCUMENTS

| | | |
|---|---|---|
| DE | 10 2008 040812 A1 | 2/2010 |
| DE | 10 2009 029119 A1 | 3/2011 |

(Continued)

OTHER PUBLICATIONS

International Search Report (Jan. 23, 2013) for corresponding International Application No. PCT/EP2012/001975.

*Primary Examiner* — Michael J Zanelli
(74) *Attorney, Agent, or Firm* — WRB-IP LLP (57) ABSTRACT

An energy management system is provided for a hybrid electric vehicle including an electrical machine for vehicle traction drive and recuperative braking, an electrical storage system ESS for storing recuperated energy, and at least one additional vehicle electrical auxiliary device different from the electrical machine. An energy management controller is arranged to, upon establishing a potential for increased amount of recuperated energy during a predicted future downhill descent, direct electrical power from the ESS to the at least one additional electrical auxiliary device for the purpose of reducing the electrical charge level of the ESS, such that an increased amount of energy may be recuperated and stored in the ESS during the predicted future downhill descent.

14 Claims, 3 Drawing Sheets

(51) Int. Cl.
*B60W 10/08* (2006.01)
*B60W 10/30* (2006.01)
*B60W 50/00* (2006.01)
*B60W 10/26* (2006.01)
*B60L 7/16* (2006.01)
*B60L 11/18* (2006.01)
*B60W 40/076* (2012.01)

(52) U.S. Cl.
CPC .... *B60W 2510/244* (2013.01); *B60W 2550/143* (2013.01); *B60W 2550/402* (2013.01); *B60W 2710/244* (2013.01); *B60W 2710/305* (2013.01); *Y02T 10/84* (2013.01)

(56) References Cited

U.S. PATENT DOCUMENTS

| | | | |
|---|---|---|---|
| 2011/0125351 A1* | 5/2011 | Bauerle | 701/22 |
| 2011/0264317 A1* | 10/2011 | Druenert et al. | 701/22 |
| 2012/0041629 A1* | 2/2012 | Yamada et al. | 701/22 |
| 2013/0296102 A1* | 11/2013 | Banker et al. | 477/4 |

FOREIGN PATENT DOCUMENTS

| | | |
|---|---|---|
| DE | 10 2010 010149 A1 | 9/2011 |
| DE | 10 2010 030247 A1 | 12/2011 |
| EP | 1 136 311 A2 | 9/2001 |
| JP | 2012-001168 A * | 1/2012 |

* cited by examiner

ENERGY MANAGEMENT SYSTEM AND FUEL SAVING METHOD FOR A HYBRID ELECTRIC VEHICLE

BACKGROUND AND SUMMARY

The present invention relates to an energy management system for a hybrid electric vehicle that comprises an electrical machine for vehicle traction drive and recuperative braking, an electrical storage system for storing recuperated energy, and at least one additional vehicle electrical auxiliary device different from said electrical machine. The present invention further relates to a fuel saving method for said hybrid electric vehicle.

The overall aim of energy management systems for hybrid electric vehicles is to manage electrical power consumption and power recuperation to lower overall fuel consumption and emissions, and improving vehicle drivability.

Document US 2005/0274553 A1 shows a predictive energy management system for hybrid electric vehicles which, based on predicted driving cycles and terrain, selects a power command to operate an electric motor and an engine for the purpose of achieving better fuel economy and lower emissions. Further improvements with respect to fuel consumption and engine emission are however desired.

It is desirable to provide an inventive energy management system for a hybrid electric vehicle that brings about further improvements with respect to fuel consumption and engine emission, which vehicle comprising an electrical machine for vehicle traction drive and recuperative braking, an electrical storage system ESS for storing recuperated energy, and at least one additional vehicle electrical auxiliary device different from said electrical machine. According to an aspect of the invention, an energy management controller is arranged to, upon establishing a potential for increased amount of recuperated energy during a predicted future downhill descent, direct electrical power from said ESS to said at least one additional electrical auxiliary device for the purpose of reducing the electrical charge level of the ESS, such that an increased amount of energy may be recuperated and stored in said ESS during said predicted future downhill descent.

According to another aspect of the invention, a fuel saving method for a corresponding hybrid electric vehicle is provided, which method comprises the steps of establishing a potential for increased amount of recuperated energy during a predicted future downhill descent, and subsequently directing electrical power from said ESS to said at least one additional electrical auxiliary device for the purpose of reducing the electrical charge level of the ESS, such that an increased amount of energy may be recuperated and stored in said ESS during said predicted future downhill descent.

The inventive system and method is based on intelligent use of a predicted future travel path for increasing the anion of recuperated energy during recuperative braking of the vehicle. Without the inventive solution, there is a risk that the ESS may become fully charged during a downhill descent, whilst further braking of the vehicle is required. Moreover, the inventive system does not need to operate the electrical machine for reducing the electrical charge level of the ESS prior to arrival at the predicted descend, but is instead arranged to direct electrical power from said ESS to said at least one additional electrical auxiliary device. The inventive solution thus provides an alternative solution for reducing the electrical charge level of the ESS that is independent of travel path. The inventive solution also presents a plurality of additional electrical auxiliary devices that may be powered with electrical energy from the ESS, thereby increasing the freedom of selection of which power consumer to use, dependent on current and predicted future circumstances. The plurality of additional electrical auxiliary devices also facilitate a relatively large power consumption rate that might be required for reducing the electrical charge level of the ESS at a sufficiently high rate.

The potential for increased amount of recuperated energy is preferably established if an estimated amount of recuperated energy generated by recuperative braking during said predicted future downhill descent exceeds the estimated remaining maximal allowed storage capacity of the ESS. By comparing estimated amount of recuperated energy with estimated remaining maximal allowed storage capacity of the ESS, an efficient tool for determining energy management strategy is provided. Estimation of current SOC of the ESS may be performed by means of a battery management system.

The estimated amount of recuperated energy generated by recuperative braking during said predicted future downhill descent is preferably divided into a first portion that is intended to power at least one additional vehicle electrical auxiliary device during said downhill descent, and a second portion that is intended to be stored in said ESS, and the potential for increased amount of recuperated energy is preferably established if said second portion of said recuperated energy exceeds the estimated remaining maximal allowed storage capacity of the ESS. Direct operation of at least one additional vehicle electrical auxiliary device by recuperated energy results in improved fuel efficiency, because conversion losses upon charging and discharging of the ESS is reduced. Increased flexibility with respect to type and quantity of direct power consumers of recuperated energy is also provided.

The establishment of said potential for increased amount of recuperated energy preferably also takes into account predicted future travel path altitude information up to the start of said predicted future downhill descent.

Additional traction drive by the electrical machine during an uphill path segment in front of the predicted descent might otherwise give an incorrect estimate of the state of charge of the EES at the start of the predicted descent.

The estimated remaining maximal allowed storage capacity of the ESS is preferably determined taking into account an estimated state of charge of said ESS at the start of said predicted future downhill descent.

The at least one additional vehicle electrical auxiliary device is preferably formed by any of a heating system, ventilation system, air conditioning system, starter battery, air compressor, exhaust emission reducing system, engine cooling system, engine lubrication system, steering system, hydraulic or kinetic energy storage systems.

The at least one additional vehicle electrical auxiliary device is preferably coupled to a low voltage network, in particular a 6-50 volts network, or the at least one additional vehicle electrical auxiliary device is preferably coupled to a high voltage network, in particular a 100-1000 volts network. The low voltage network is suitable for relatively low power applications, whereas the high voltage network is suitable for relatively high power applications.

The future downhill descent is preferably predicted by means of a vehicle future travel path prediction system, which may comprise a GPS in combination with travel path altitude information, or travel path recognition system with travel path altitude information, or a combination thereof.

The predicted future downhill descent is preferably established if the start thereof is located within a certain distance from the vehicle. The distance may for example be up to 2 km, preferably up to 10 km, more preferably up to 20 km.

The energy management controller may preferably override normal control of said at least one additional vehicle electrical auxiliary device upon powering of said at least one additional electrical auxiliary device by electrical energy from said ESS for the purpose of reducing the electrical charge level of the ESS. Some of the additional vehicle electrical auxiliary devices are during normal control periodically operated, or operated to attain a target value, or operated to be positioned in a predefined range. The time of normal operation does however rarely coincide with the time of operation required by the energy management system. Therefore, the energy management system may override the normal control.

BRIEF DESCRIPTION OF THE DRAWINGS

The present invention will now be described in detail with reference to the figures, wherein.

DETAILED DESCRIPTION

Various aspects of the invention will hereinafter be described in conjunction with the appended drawings provided to illustrate and not to limit the invention, wherein like designations denote like elements, and variations of the aspects are not restricted to the specific, shown aspect, but are applicable on other variations of the invention.

Figure 1:
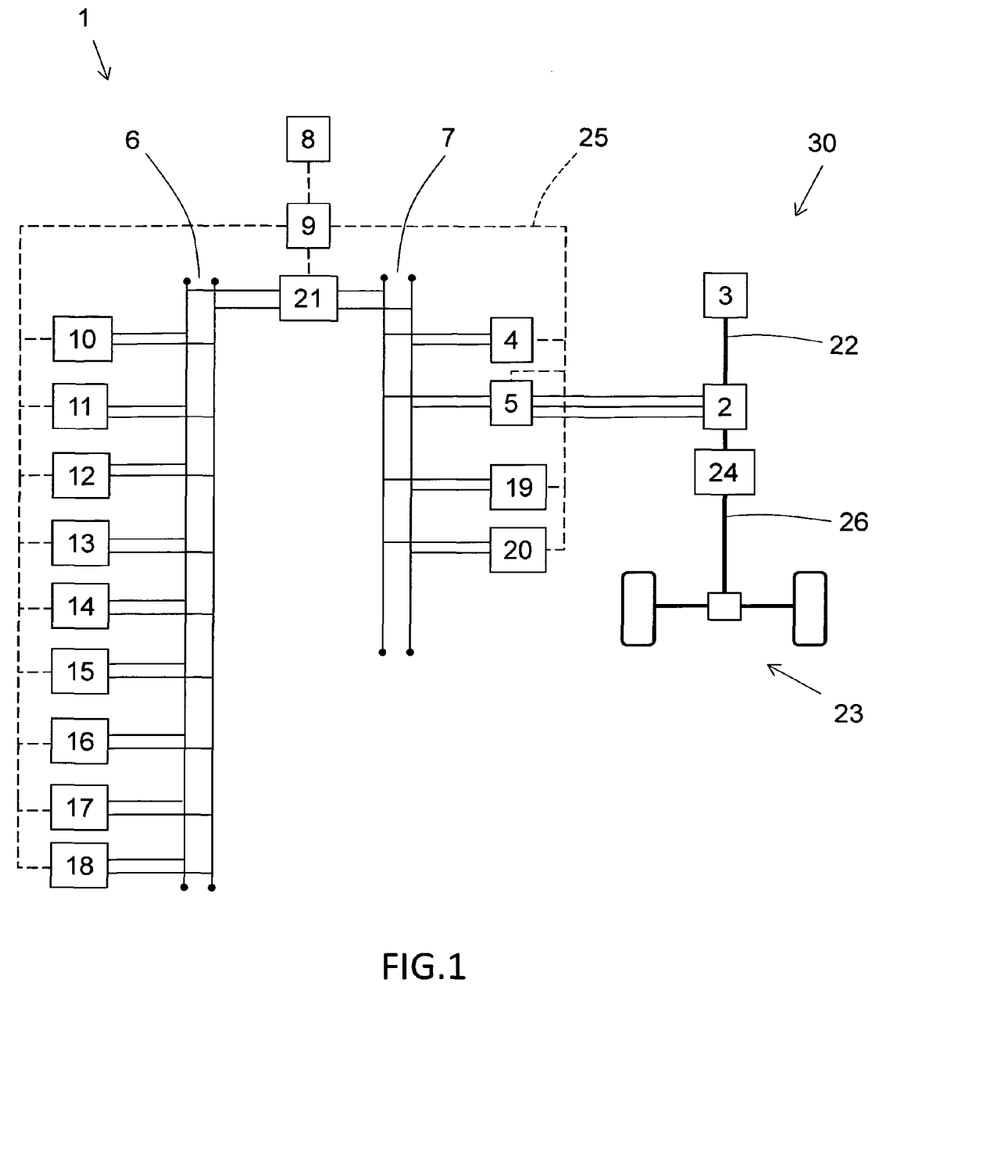
FIG. 1 shows a schematic overview of the energy management system according to the invention.

FIG. 1 shows an example of a schematic system design used for implementing the inventive energy management system 1. The energy management system 1 is designed for use in hybrid electric vehicles HEV, which in general are characterised by their drive train that has combined propulsion by means of an electrical machine 2, as well as a combustion engine 3. The disclosed inventive embodiment shows a parallel hybrid drive train system, in which the combustion engine 3 is rotatably connectable and disconnectable to the electrical machine 2 via a first drive shaft 22. The electrical machine 2 is subsequently rotatably connected to the rear wheels and wheel shafts 23 via transmission 24 and a second drive shaft 26. The invention is however not limited to a parallel hybrid drive train system, but may be equally implemented on a series or series-parallel hybrid drive train system.

The HEV further comprises an electrical storage system ESS 4 electrically connected to the electrical machine 2 via power electronics 5, which is arranged to convert the electrical power feed to and received from the ESS 4 and electrical machine 2. The power electronics 5 may for example comprise a DC/DC converter and/or a DC/AC inverter, etc., depending on the specific system design used. The ESS may comprise one or more batteries, and/or super capacitors, or the like, capable of storing electrical energy. The electrical machine 2 is further adapted to be able to operate as an electrical generator, thereby providing recuperative braking of the vehicle. Vehicle kinetical energy is thereby convened to electrical energy, which may be feed to the EES 4 for energy storage, or used for direct powering of other electrical devices. The energy management system 1 further comprises at least one additional vehicle electrical auxiliary device different from the electrical machine 2. The additional vehicle electrical auxiliary device may for example be a heating system 10 including an electrical heater, a ventilation system 11 including an electrical fan, an air conditioning system 12 including electrically powered compressor, a starter battery 13 of preferably 12, 24 or 48 volt, an electrically powered air compressor 14 of the vehicle compressed air system, an exhaust emission reducing system 15 including an electrical heater, an engine cooling system 16 including an electrically powered pump, an engine lubrication system 17 including an electrically powered pump, an electrically powered steering system 18 including an electrically powered pump, or a hydraulic, or kinetic energy storage system 19, 20, such as an hydraulic accumulator or flywheel based system.

The energy management controller 9 may for the purpose of reducing the charging level of the ESS 4 override normal control of certain additional vehicle electrical auxiliary devices. For example, the energy management controller 9 may decide to temporarily increase heating or cooling of the driver cabin and/or any refrigerated cargo space, taking into account that the actual temperature thereof changes rather slowly, thereby minimizing any driver observations of cabin environment changes. The energy management controller 9 may also decide to temporarily increase charging rate of the starter battery 13, to operate the air compressor 14 additionally up to maximal pressure of the air tanks, to perform non-planned regeneration of the exhaust emission reducing system 15, or the like.

The vehicle according to the disclosed embodiment comprises a low voltage DC network 6, also referred to a low voltage DC bus, a high voltage DC network 7, also referred to a high voltage DC bus, and a DC/DC converter 21 connecting said networks 6, 7. High-power DC/DC converters provide the electrical link between the vehicle low voltage network and the high voltage network used mainly for the power train. The DC/DC converter 21 may thus transfer electrical energy between said networks 6, 7 despite the voltage difference therebetween. The low voltage network 6 typically carries a supply voltage somewhere in the 6 V to 50 V range, and is suitable for powering less power demanding electrical applications, and the high voltage network 7 typically carries a supply voltage somewhere in the 100 V to 1000 V range, and is suitable for high power applications, such as the power electronics 5 used for powering the electrical machine 2 for traction drive and power recuperation. In the disclosed embodiment, some of the additional vehicle electrical auxiliary devices 10-18 are connected to the low voltage network 6, whereas others 19, 20 are connected to the high voltage network 7, but this is only illustrative. The electrically powered air compressor 14 could for example alternatively be connected to the high voltage network 7 if this system configuration was deemed more advantageous.

The inventive system 1 is specifically suitable for heavy road vehicles, such as heavy trucks, busses, but may also be used by other vehicles, such as cars.

The inventive concept is based on intelligent use of a predicted future travel path for increasing the amount of recuperated energy during recuperative braking of the vehicle. Without the inventive solution, there is a risk that the ESS 4 may become fully charged, i.e. that the state of charge SOC of the EES 4 has reached its maximal allowed level, whilst further recuperative braking is available. Instead, other vehicle braking devices may have to replace the electrical machine 2, such as friction brakes, or retarders, or the additional recuperated electrical energy that cannot be stored in the fully charged ESS 4 is simply dissipated as heat in a thermal element arranged externally of the vehicle.

Vehicle travel path prediction systems 8 as such are well known in the prior art, and two different alternative examples for implementing the vehicle travel path prediction systems 8 are hereinafter presented for use in the inventive energy management system 1. According to a first alternative, the vehicle travel path prediction systems 8 may comprise a GPS-device in combination with travel path altitude information, which maps at least road altitude and geographic position. According to a second example, a travel path recognition system is provided that includes a self-learning travel path altitude information system. Such a self-learning system initially builds up a digital map by registering estimated geographical position and road inclination, for example by means of inclination sensors and/or engine load, and during subsequent travels the system may recognise the current travel path and thereby predict any future downhill descents with a high degree of certainty.

An energy management controller 9 is a central part of the energy management system 1. The energy management controller 9 is arranged to receive information from the vehicle travel path prediction system 8, as well as current SOC of the EES 4, and based at least thereon establishing a potential for increased amount of recuperated energy during a predicted future downhill descent. The potential for increased amount of recuperated energy may for example be established if an estimated amount of recuperated energy generated by recuperative braking during a predicted future downhill descent exceeds the estimated remaining maximal allowed storage capacity of the ESS 4. Said potential may of course be re-evaluated during the travel path up to the start of the predicted descent. The energy management controller 9 may be set up to have a certain limitation with respect to distance ahead of vehicle that is taken into account by the energy management controller 9. The limitation may be set in length, such as kilometers, or time, such as seconds. For example, the energy management controller 9 may be set up to react only to predict future downhill descents that starts within 2 km, or 5 km, or 10 km, or 20 km from the vehicle.

The estimated remaining maximal allowed storage capacity of the ESS 4 may be determined based cm the actual estimated SOC of the ESS 4, as well as the maximal allowed storage capacity of the ESS 4. In addition, route information of the travel path from the current position up to the start of the downhill descent may also be taken into account when determining the estimated maximal allowed storage capacity of the ESS 4. If for example the travel path comprises an uphill segment arranged between current position and the start of the predicted future downhill descent, additional traction drive by the electrical machine 2 might be required, thereby reducing the SOC of the ESS 4, such that the estimated amount of recuperated energy generated by recuperative braking during, a predicted future downhill descent does no longer exceed the estimated remaining maximal allowed storage capacity of the ESS 4. Other aspects that might be taken into account when estimating the remaining maximal allowed storage capacity of the ESS 4 are planned or estimated electrical consumption of one or more of the additional vehicle electrical auxiliary devices 10-20.

Control and communication lines 25 connect the energy management controller 9 with the vehicle travel path prediction system 8, the EES 4, the power electronics 5, the DC/DC converter 21 and the additional vehicle electrical auxiliary devices 10-20. The control and communication lines 25 may for example be implemented by a CAN Bus, or the like.

The energy management controller is subsequently arranged to, upon establishing that a potential for increased amount of recuperated energy during a predicted future downhill descent is possible, direct electrical power from said ESS 4 to said at least one additional electrical auxiliary device 10-20 for the purpose of reducing the electrical charge level of the ESS 4 before reaching the predicted future downhill descent. This electrical management strategy thus attempts to prevent the situation where the vehicle descends a slope with applied vehicle brakes and with a fully charged EES 4, thereby preventing the vehicle kinetical energy to be recuperated and stored in the ESS 4. However, by means of the inventive energy management system 1, an increased amount of energy may be recuperated and stored in said ESS 4 during said downhill descent.

Figure 2:
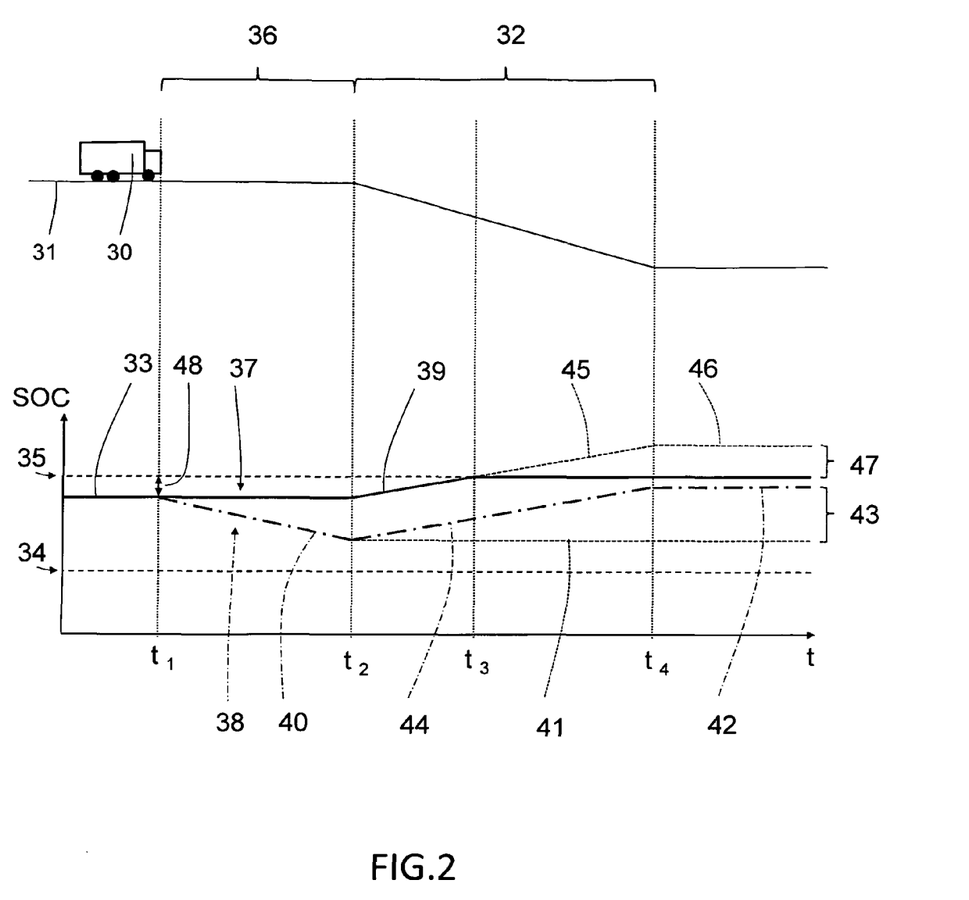
FIG. 2 shows the inventive effect of a simplified exemplary travel path according to a first energy saving: strategy of the invention.

FIG. 2 shows the inventive effect of an exemplary travel path according to a first energy saving strategy, in which all recuperated energy is used for charging the ESS 4. A vehicle 30 travels along a horizontal travel path 31 and approaches a downhill descent 32. Immediately before time ti, the SOC of the ESS 4 is constant at first level 33, which is within a range defined by a minimal allowed storage level 34 and maximal allowed storage capacity 35, for example 30% and 60% of the ESS 4 total storage capacity respectively.

At time ti, the energy management controller 9 has received information from the vehicle travel path prediction system 8 of a predicted future downhill descent 32 starting within a certain distance 36, for example 10 km, as well as an estimate of the length and altitude data of said predicted future downhill descent 32. Based on said estimated downhill data, estimated recuperation efficiency and Charging efficiency, and current SOC of the EES 4, the energy management controller 9 generates two estimates 37, 38 of the SOC of the ESS 4 at time corresponding to the end of the predicted downhill descent 32.

The first estimate 37, marked with continuous line in FIG. 2, corresponds to the estimated progression of the SOC without the inventive concept, i.e. without initiating transfer of electrical power from the ESS to at least one additional electrical auxiliary device before arrival at the predicted future downhill descent 32, for the purpose of reducing, the electrical charge level of the ESS 4 before arrival at the predicted future downhill descent 32. The estimated remaining maximal allowed storage capacity 48 of the ESS 4 is here the difference between the maximal allowed storage capacity 35 and the SOC of the ESS 4 at said first level 33.

According to the first estimate 37, the SOC is constant at the first SOC level 33 up to time t2, corresponding to the start of the predicted future downhill descent 32, at which time point the electric machine 2 starts recuperating energy by recuperative braking of the vehicle 30 for the purpose of not overspeeding. All recuperated energy is estimated to be transferred to the ESS 4 taking into account estimated recuperation efficiency and charging efficiency. The estimated progression of the SOC is here for simplicity estimated to follow a linear path 39. The maximal allowed storage capacity 35 is estimated to be reached at time t3) after which no further charging of the ESS 4 is permitted. Further braking of the vehicle 30 after time t3 may be performed by main friction brakes, vehicle auxiliary brakes, or by directing further recuperated energy to an electrical power sink in the form of onboard resistors, or the like.

The second estimate 38, marked with dash-dot line in FIG. 2, corresponds to the estimated progression of the SOC upon use of the inventive concept, i.e. including initiation of transfer of electrical power from the ESS to at least one additional electrical auxiliary device before arrival at the predicted future downhill descent 32, for the purpose of reducing the electrical charge level of the ESS 4 before arrival at the predicted future downhill descent 32. The transfer of electrical energy to said at least one additional electrical auxiliary device may be continuous at a certain constant level, as shown by the linear initial downward slope 40 in FIG. 2, or intermittent and/or with varying electrical transfer rate, all depending on aspects such as the specific ESS specification, first level SOC 33, ESS temperature, target SOC 41 at start of predicted future downhill descent 32, etc. The target SOC 41 at the start of predicted future downhill descent 32 is on the other hand determined based on target SOC 42 at end of predicted future downhill descent 32, as well as total estimated charging 43 of ESS 4 by recuperated energy during said descent 32.

According to the second estimate 38, the SOC is linearly reduced up to time t2, which corresponds to the start of the predicted future downhill descent 32, at which time point the electric machine 2 starts recuperating energy by recuperative braking of the vehicle 30 for the purpose of not overspeeding. All recuperated energy is estimated to be transferred to the ESS 4 taking into account estimated recuperation efficiency and charging efficiency. The estimated progression of the SOC is here estimated to follow a linear path 44. Due to the reduction of SOC of the ESS 4 before reaching the descent 32, all recuperated energy up to time t^, which corresponds to the end of the descent 32, may be transferred to the ESS 4, thereby increasing the vehicle energy recuperation efficiency, and fuel efficiency.

As mentioned above, the potential for increased amount of recuperated energy is established if an estimated amount of recuperated energy generated by recuperative braking during a predicted future downhill descent exceeds the estimated remaining maximal allowed storage capacity of the ESS 4. In FIG. 2, the estimated amount of recuperated energy generated by recuperative braking during the predicted future downhill descent corresponds to the total estimated charging 43 of the ESS 4, and the estimated remaining maximal allowed storage capacity 48 of the ESS 4 corresponds to the difference between maximal allowed storage capacity 35 and the first level SOC 33 at time.

According to a further advantageous aspect, the establishment of a potential for increased amount of recuperated energy may in addition take into account predicted future travel path altitude information up to the start of said predicted future downhill descent 32, i.e. the travel path 36 traveled between time points ti and t2. In FIG. 2, this travel path 36 is depicted flat and without any traction drive operation of the electrical machine 2, but said travel path 36 may for example include an uphill segment, or other type of navel segment, where traction drive operation of the electrical machine 2 is estimated to occur, which traction drive operation will reduced the SOC of the ESS 4, thereby affecting the establishment of potential for increased amount of recuperated energy.

For the sole purpose of illustrating the estimated amount of increased recuperated energy by means of the invention, the linear path 39, which corresponds to the estimated progression of the SOC during charging, is continued with a further slope 45 extending between time t3 to tt. The fictive SOC 46 of the ESS 4 at time U of the first estimate 37 thus corresponds to the estimated SOC if charging was allowed to continue at time t3, which corresponds to the time when the ESS 4 was estimated to reach its maximal allowed storage capacity 35. The estimated amount of increased recuperated energy 47 by means of the invention is here derived by subtracting maximal allowed storage capacity 35 front the fictive SOC 46 of the ESS 4 at time t4. Linear paths 39, 45 corresponding to the estimated progression of the SOC during charging of the first and second estimate 37, 38 are for simplicity parallel.

Figure 3:
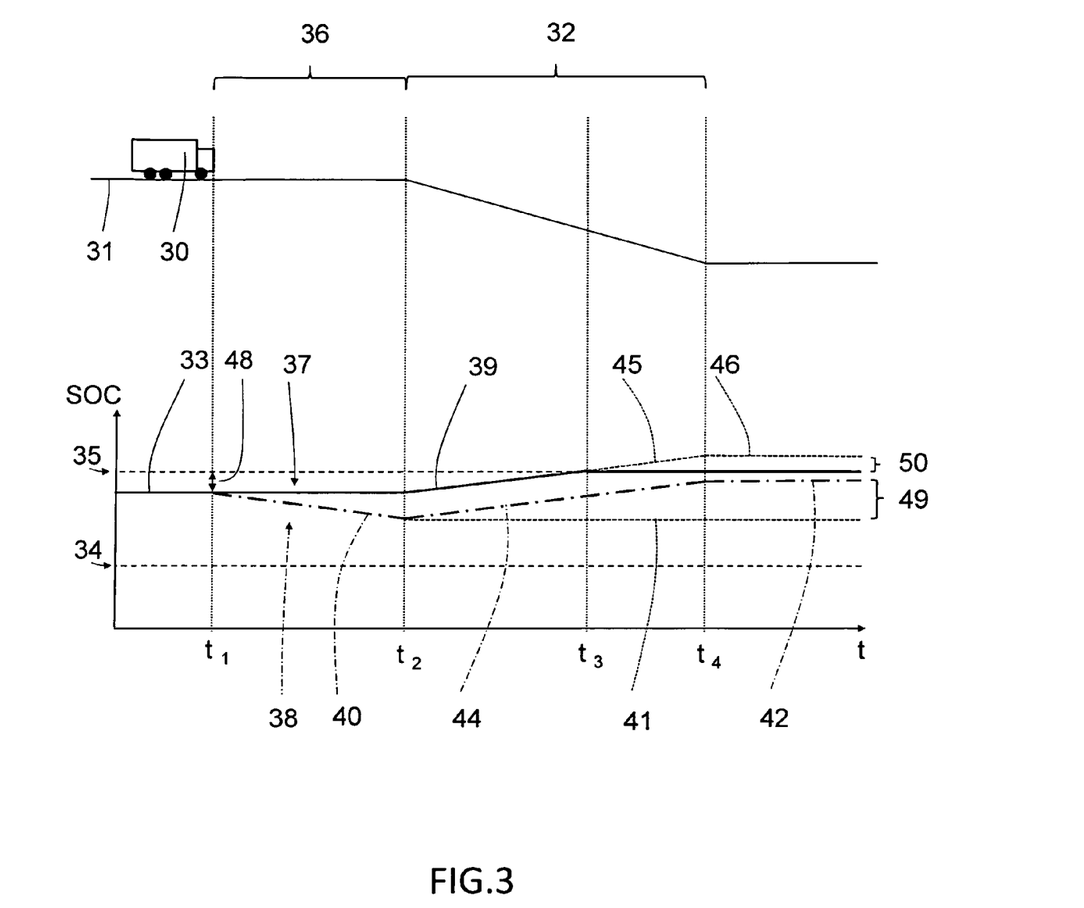
FIG. 3 shows the inventive effect of a simplified exemplary travel path according to a second energy saving strategy of the invention.

As mentioned above, all recuperated energy is used for charging the ESS 4 according to the first energy saving strategy as illustrated in FIG. 2. A part of the energy recuperated by the electrical machine 2 during the predicted downhill descent 32 may however according to a second energy saving strategy be directed to at least one additional vehicle electrical auxiliary device for direct powering thereof. The advantage of direct powering is the elimination of electrical conversion losses, which occurs during charging and discharging of the ESS 4. FIG. 3 shows the inventive effect of an exemplary travel path according to said second energy saving strategy, where said estimated amount of recuperated energy generated by recuperative braking during said predicted future downhill descent 32 is divided into a first portion that is intended to power at least one additional vehicle electrical auxiliary device during said downhill descent 32, and a second portion that is intended to be stored in said ESS 4. Both linear SOC progression lines 39, 44 between time points t2 and t3, which progression lines 39, 44 correspond to said first and second estimate respectively, relate to said second portion only. For example, out of the total estimated amount of recuperated energy during the descent 32, a first portion corresponding approximately to 20% of the total amount is used for direct powering of at least one additional vehicle electrical auxiliary device during said downhill descent 32, and a second portion 49, i.e. the rest, which thus corresponds approximately to 80% of the total amount, is directed to the ESS 4 for storage thereof.

The fact that only a portion of the total estimated amount of recuperated energy during the descent 32 is directed to the ESS 4, the charging rate of the ESS 4 will be lower in the second energy saving strategy of FIG. 3 compared with the first energy saving strategy of FIG. 2, if other factors are preserved. This difference in charging rate can be identified by a reduced inclination of the linear SOC progression lines 39, 44 between time points t2 and t3 in FIG. 3. For the purpose of avoiding to low target SOC 42 at end of predicted fixture downhill descent 32, also the transfer rate of electrical energy to said at least one additional electrical auxiliary device before arrival to the descent, i.e. before time t2, is reduced, as illustrated by the reduced inclination of the linear initial downward slope 40 in FIG. 3 compared with linear initial downward slope 40 of FIG. 2.

According to the second energy saving strategy, the potential fir increased amount of recuperated energy is established if the second portion 49 of the estimated amount of recuperated energy exceeds the estimated remaining maximal allowed storage capacity of the ESS 4. The estimated remaining maximal allowed storage capacity 48 of the ESS 4 corresponds in FIG. 3 to the difference between maximal allowed storage capacity 35 and the first level SOC 33 at time t.

For the sole purpose of illustrating the estimated amount of increased amount of energy stored in the ESS 4 by means of the second energy saving strategy of the invention, fictive SOC progression lines 45, 46 are included in FIG. 3 similar to those of FIG. 2. The estimated amount of increased recuperated energy 50 to be stored in the ESS 4 by means of the invention is here derived by subtracting maximal allowed storage capacity 35 from the fictive SOC 46 of the ESS 4 at time—

An inventive fuel saving method for a hybrid electric vehicle is also disclosed. The method comprises the initial step of establishing, a potential for increased amount of recuperated energy during a predicted future downhill descent. Upon determining that such an potential exists, the method further comprises the step of directing electrical power from said ESS 4 to said at least one additional electrical auxiliary device 10-20 for the purpose of reducing the electrical charge level of the ESS 4, such that an increased amount of energy may be recuperated and stored in said ESS 4 during said predicted future downhill descent 32.

The inventive energy management system 1 is in FIG. 1 schematically disclosed by means of different functional units, such as energy management controller 9, vehicle travel path prediction system 8, EES 4, etc., and it should be noted that this system layout is purely one embodiment for implementing the invention, and many other system layout may be equally used.

Furthermore, some of the shown separate functional units of FIG. 1 may be integrated into a single function unit having or oppositely, all within the scope of the appended claims. The predicted travel path 31 and estimated SOC progression lines 37, 38 of FIG. 2 and FIG. 3 are only simplified linear versions for describing the invention.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims.

Accordingly, the drawings and the description thereto are to be regarded as illustrative in nature, and not restrictive.

The invention claimed is:

1. Energy management system for a hybrid electric vehicle that comprises an electrical machine for vehicle traction drive and recuperative braking, an electrical storage system ESS for storing recuperated energy, and at least one additional vehicle electrical auxiliary device different from the electrical machine, wherein an energy management controller is arranged to, upon establishing a potential for increased amount of recuperated energy during a predicted future downhill descent, direct electrical power from the ESS to the at least one additional electrical auxiliary device for the purpose of reducing the electrical charge level of the ESS, such that an increased amount of energy may be recuperated and stored in the ESS during the predicted future downhill descent, wherein the establishment of the potential for increased amount of recuperated energy also takes into account predicted future travel path altitude information up to a start of the predicted future downhill descent.

2. Energy management system according to claim 1, wherein the potential for increased amount of recuperated energy is established if an estimated amount of recuperated energy generated by recuperative braking during the predicted future downhill descent exceeds an estimated remaining maximal allowed storage capacity of the ESS.

3. Energy management system according to claim 2, wherein the estimated amount of recuperated energy generated by recuperative braking during the predicted future downhill descent is divided into a first portion that is intended to power at least one additional vehicle electrical auxiliary device during the downhill descent, and a second portion that is intended to be stored in the ESS, and in that the potential for increased amount of recuperated energy is established if the second portion of the estimated amount of recuperated energy exceeds the estimated remaining maximal allowed storage capacity of the ESS.

4. Energy management system according to claim 1, wherein an estimated remaining maximal allowed storage capacity of the ESS is determined taking into account an estimated state of charge SOC of the ESS at the start of the predicted future downhi descent.

5. Energy management system according to claim 1, wherein the at least one additional vehicle electrical auxiliary device is formed by any of a heating system, a ventilation system an air conditioning system, a starter battery, an air compressor, an exhaust emission reducing system, an engine cooling system, an engine lubrication system, a steering system, or a hydraulic, or kinetic energy storage systems.

6. Energy management system according to claim 5, wherein the at least one additional vehicle electrical auxiliary device is coupled to a low voltage network, or the at least one additional vehicle electrical auxiliary device is coupled to a high voltage network.

7. Energy management system according to claim 1, wherein the predicted future downhill descent is predicted by means of a vehicle future travel path prediction system that comprises a GPS in combination with travel path altitude information, or travel path recognition system with travel path altitude information, or a combination thereof.

8. Energy management system according to claim 1, wherein the predicted future downhill descent is established if a start of the descent is located within a certain distance from the vehicle.

9. Energy management system according to claim 1, wherein the energy management controller may override normal control of the at least one additional vehicle electrical auxiliary device upon powering of the at least one additional electrical auxiliary device by electrical energy from the ESS for the purpose of reducing the electrical charge level of the ESS.

10. Fuel saving method for a hybrid electric vehicle that comprises an electrical machine for vehicle traction drive and recuperative braking, an electrical storage system ESS for storing recuperated energy, and at least one additional vehicle electrical auxiliary device different from the electrical machine, comprising:
  establishing a potential for increased amount of recuperated energy during a predicted future downhill descent; and
  directing electrical power from the ESS to the at least one additional electrical auxiliary device for the purpose of reducing the electrical charge level of the ESS, such that an increased amount of energy may be recuperated and stored in the ESS during the predicted future downhill descent,
  wherein the establishment of the potential for increased amount of recuperated energy takes into account predicted future travel path altitude information up to a start of the predicted future downhill descent.

11. Fuel saving method according to claim 10, comprising establishing the potential for increased amount of recuperated energy if an estimated amount of recuperated energy generated by recuperative braking during the predicted future downhill descent exceeds an estimated remaining maximal allowed storage capacity of the ESS.

12. Fuel saving method according to claim 11, comprising:
  dividing the estimated amount of recuperated energy generated by recuperative braking during the predicted future downhill descent into a first portion that is intended to power at least one additional vehicle electrical auxiliary device during, the downhill descent, and a second portion that is intended to be stored in the ESS; and
  establishing the potential for increased amount of recuperated energy if the second portion of the estimated amount of recuperated energy exceeds the estimated remaining maximal allowed storage capacity of the ESS.

13. Fuel saving method according to claim 10, comprising determining an estimated remaining maximal allowed storage capacity of the ESS taking into account an estimated state of charge SOC of the ESS at the start of the predicted future downhill descent.

14. Fuel saving method according to claim 10, comprising allowing an energy management controller to override normal control of the at least one additional vehicle electrical auxiliary device upon powering of the at least one additional electrical auxiliary device by electrical energy from the ESS for the purpose of reducing the electrical charge level of the ESS.

\* \* \* \* \*